Sept. 15, 1970     A. P. MICHELI     3,529,180

PROPORTIONING CONTROL CIRCUIT

Filed Dec. 13, 1966     2 Sheets-Sheet 1

Inventor
Amelio P. Micheli
by Roberts, Cushman & Grover
Attys

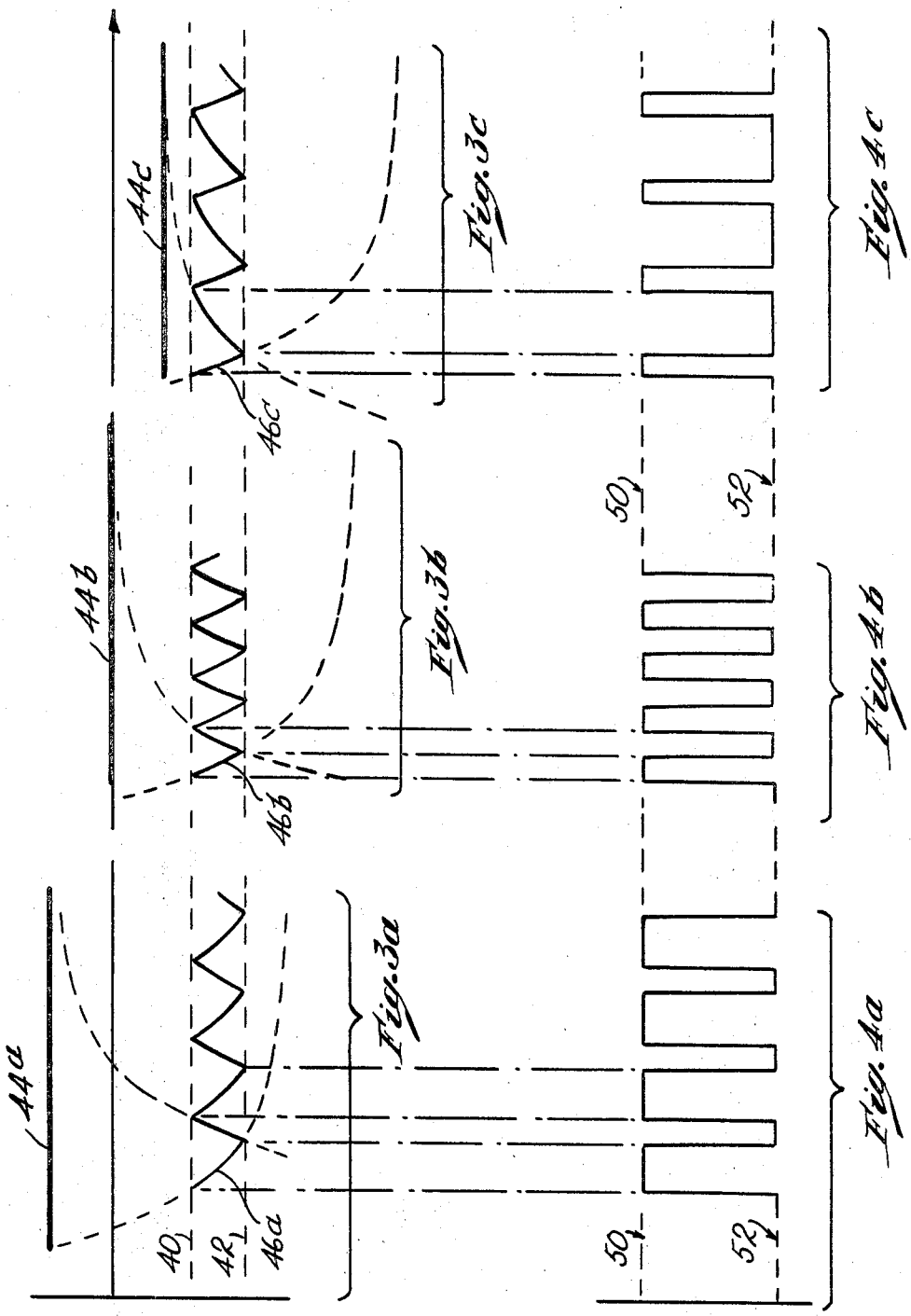

United States Patent Office 3,529,180
Patented Sept. 15, 1970

3,529,180
PROPORTIONING CONTROL CIRCUIT
Amelio P. Micheli, Medford, Mass., assignor to United Electric Controls Company, Watertown, Mass., a corporation of Massachusetts
Filed Dec. 13, 1966, Ser. No. 601,425
Int. Cl. H03k 5/20
U.S. Cl. 307—265        7 Claims

ABSTRACT OF THE DISCLOSURE

A proportioning control circuit which has two output states and which varies the ratio of duration of the two output states according to the amplitude of an input control voltage includes a triggered switch, for example a Schmitt trigger, of the type responsive to a triggering voltage and switching to its first output state when the triggering voltage rises to a first critical value, and to its second output state when its triggering voltage descends to a second critical value. A transistor inverter, operated by the Schmitt trigger, drives an integrating circuit formed by a resistor and capacitor in series, and alternately charges and discharges the capacitor exponentially during successive intervals between switches of the Schmitt trigger. The capacitor voltage is the input to a double emitter follower amplifier, which feeds back a portion of the charging and discharging voltage to the Schmitt trigger, where it appears in series with said input control voltage, so that the triggered switch is responsive to said portion and to said control voltage. Since the integrating circuit will charge and discharge with rates determined by the amplitude of the control voltage, the ratio of duration of the two output states of the triggered switch will vary with the amplitude of the control voltage.

---

This invention relates to the field of control apparatus for use with systems of the type which are to be switched between two fixed states, usually "on" and "off," to maintain within close limits a particular quality, such as temperature, of the environment regulated by the system.

Typical of such controls are on-off temperature-level triggered controls used in thermostatic control systems. Under such control a heater is turned on when temperature falls below one fixed level, remains on until temperature rises to another fixed level at which the heater is turned off, and then remains off until the temperature falls to the initial fixed level. In any system of this type it is obvious that the temperature does not remain constant but oscillates about a mean level. Because temperature change lags when the heater is turned on and off, these oscillations may have considerable amplitude, and precision of control is limited.

In many applications, the limited precision of temperature-level triggered on-off control is permissible; however, where greater precision is required a different sort of control is necessary. To provide this greater precision, resort has been made to so-called proportioning control, which cyclically turns the heater (or other system) on and off and which varies the ratio of on time to off time with temperature. Under proportioning control, for example, when temperature is below the desired level, the heater may be on more than it is off during each cycle; when the temperature is above the desired level, the heater may be off more than it is on during each cycle; and when the temperature is at the desired level, the heater may be on and off for equal times during each cycle. It is evident that if the control cycle works faster than the natural lag of the regulated environment, temperature oscillations will be damped and very precise control is possible.

Thermostatic control illustrates but one use of proportioning control. Other uses will be evident, but for the sake of simplicity of description proportioning control will be discussed as applied to thermostatic control with the understanding, however, that it is not limited to this specific application.

Typically proportioning control circuitry is governed by a control voltage whose amplitude is related to temperature, as a voltage provided by a Wheatstone bridge one arm of which is a thermistor varying its resistance with temperature in the controlled environment, and typically the circuitry has two cyclically recurring output states which drive the heater directly or drive a relay or other transfer device to operate the heater. The proportioning control circuitry then varies the ratio of duration of its two output states with the amplitude of the control voltage. Ideally, proportioning control circuits should be simple for economical manufacture and reliable operation, and adjustable so that they may be used in a variety of applications. If they are difficult to quickly adjust in speed or sensitivity to optimally suit various systems and environments, they must be virtually custom-made for each different application. Moreover, if they require a complex or unusual circuitry which makes it impossible to easily convert or adapt the ordinary on-off temperature-level triggered control circuitry to proportional control, the manufacturing costs of such proportional control circuits are substantially raised.

Objects of the present invention are to provide a proportioning control circuit which is simple, economical, sensitive, stable and positive in operation; which can utilize a typical on-off control as a part thereof for economical manufacture; and which can be easily adjusted to suit a wide variety of systems and environmental conditions.

In accordance with the present invention, the proportioning control circuit for varying the ratio of duration of two output states, which may for example govern a system directly or may govern a relay or other transfer device controlling a system, with the amplitude of a control voltage comprises a triggered switch, for example a Schmitt trigger, of the type responsive to a triggering voltage and switching to a first output state when its triggering voltage rises to a first critical value, and to a second output state when its triggering voltage descends to a second critical value. In addition, the proportioning control circuit comprises an integrating circuit; means for alternately charging and discharging the integrating circuit during the intervals between switches of said triggered switch; and feedback means for supplying a portion of the charging and discharging voltage of said integrating circuit to said triggered switch in series with said control voltage so that said triggered switch is responsive to a triggering voltage comprising said portion and said control voltage, whereby the ratio of duration of the two output states of the triggered switch varies with the amplitude of the control voltage.

These and other objects and novel aspects of the invention will become apparent in the following description of a typical embodiment of the invention, shown in the accompanying drawings in which.

Figure 2:
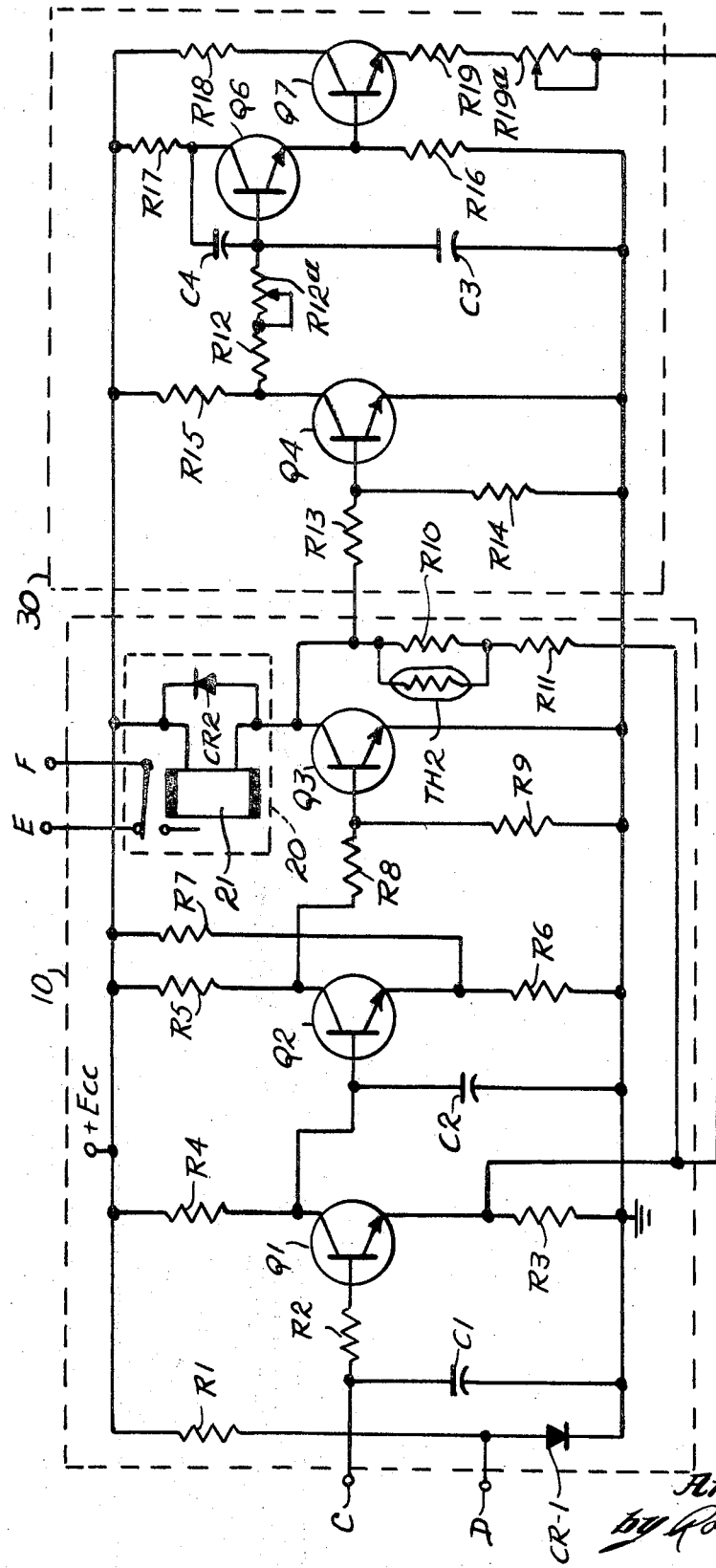
FIG. 2 is a circuit diagram of the proportioning control circuit.

FIGS. 3a, 3b and 3c are graphs illustrating the triggering voltage of the circuit of FIG. 2 for various amplitudes of control voltage; and FIGS. 4a, 4b and 4c are graphs representing the output of the circuit of FIG. 2 for the amplitudes of control voltage of FIGS. 3a, 3b and 3c respectively.

Figure 1:
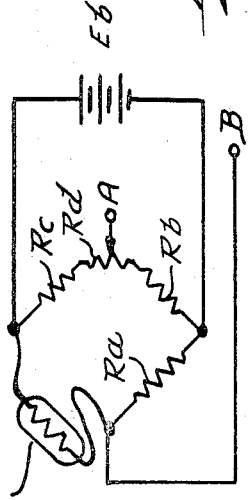
FIG. 1 is a circuit diagram of typical means for providing a control voltage.

Referring now to the drawings, FIG. 1 illustrates conventional means for producing a control voltage related to the quality, here temperature, to be regulated by the proportioning control circuit of FIG. 2. A thermistor TH1 forms one arm of a Wheatstone bridge having resistors R$a$, R$b$, R$c$ and R$d$ in the other arms. Resistor R$d$ is a potentiometer divided to provide output terminal A, which can be adjusted to provide a variable null point for the bridge. Diagonally opposite terminal A is terminal B, and across the opposite diagonal of the bridge a voltage source E$b$ is applied. With the elements arranged as shown in FIG. 1, it is apparent that an increasing temperature will provide a decreasing resistance in thermistor TH1 and a decreasing control voltage between terminals B and A. The control voltage appearing at terminals A–B is applied to terminals C–D in the circuit of FIG. 2, for example, with terminals A and C connected, and terminals B and D connected.

Terminals C–D form the inputs to a proportioning control circuit according to the invention, which in the illustrated embodiment comprises a triggered switch 10, a load 20 driven by the switch 10 and providing output terminals E–F, and proportioning control means 30 interconnected as hereinafter explained with the switch 10. The triggered switch 10 is of the type responsive to a triggering voltage, and which switches to a first output state when its triggering voltage rises to a first critical value, and to a second output state when its triggering voltage descends to a second critical value. The triggered switch 10 shown is a modified Schmitt trigger, which falls within the class of devices described. The triggered switch 10 drives a load 20, here including a relay 21 of standard type with a 150Ω coil winding. The relay contacts open and close output terminals E–F to which an external system (not shown), such as a heater, is connected. Where desired switching occurs at a rate too high for a relay, or where average current sensitive devices are to be controlled by the circuit, other elements such as SCR's (silicon controlled rectifiers) may be substituted for the relay with appropriate modifications.

The electrical connections of the circuit components of the illustrated embodiment of the triggered switch 10 are clearly shown in FIG. 2 which is to that extent self-explanatory, while the appropriate structural characteristics, values, ratings or commercially accepted designations for each of the components are given below in a list which refers to the numerals of FIG. 2. It should be noted that capacitors C1 and C2 are selected to have values which make them behave substantially as open circuits to the signals involved, and therefore they may be ignored for purposes of circuit analysis.

| Components | Value or type |
|---|---|
| C1 | 1.0 microfarad. |
| C2 | 6.0 microfarads. |
| R1 | 3300 ohms. |
| R2 | 470 ohms. |
| R3 | 27 ohms. |
| R4 | 3300 ohms. |
| R5 | 3300 ohms. |
| R6 | 47 ohms. |
| R7 | 680 ohms. |
| R8 | 1500 ohms. |
| R9 | 750 ohms. |
| R10 | 10,000 ohms |
| R11 | 10,000 ohms |
| TH2 | Thermistor, type "Fenwal QB 4162, 10 K at 25° C." |
| Q1 | Transistor, type "GE 2N2926." |
| Q2 | Transistor, type "GE 2N2926." |
| Q3 | Transistor, type "RCA 2N2270." |
| CR1 | Diode, type "RCA 1N3754." |
| CR2 | Diode, type "RCA 1N3754." |
| Ecc | 15 volts. |

It will be understood that the specific values and ratings given are subject to adjustments applied on initial and performance testing, according to routine practice in the manufacture of devices of this type. It will be further understood that the values as well as types and relationships of the various components are those of practical embodiments so that deviations therefrom are to be expected for other embodiments still within the scope of the invention. For example, in appropriate circumstances, it is contemplated that the circuitry shown as triggered switch 10 may be replaced by other elements appropriately biased and loaded to perform as a triggering switching device as described above.

As inspection of illustrated triggered switch 10 will verify, this switch is of the type which is responsive to a triggering voltage. Considering the triggered switch 10 in isolation, i.e., as if the proportioning control means within dotted line 30 were removed, the voltage to which the triggered switch responds, or the triggered voltage, is the voltage between terminals C and D, or the control voltage. Thus, without proportioning control means 30, the circuit performs as an ordinary on-off temperature level triggered switch. As will be explained later, the proportioning control means 30 supplies a component of voltage (across resistor R3) in series with the control voltage, wherein the triggered switch responds to the sum of the control voltage and the portion supplied by proportioning control means 30, or in other words, the triggering voltage is modified by the proportioning control means to comprise the control voltage and the component of voltage supplied by proportioning control means 30.

The illustrated triggered switch 10 switches to a first output state (high collector current, low collector voltage in transistor Q3) when the triggering voltage rises to a first critical value (the value at which transistor Q1 begins to turn on). Likewise, triggered switch 10 switches to a second output state (low collector current, high collector voltage in transistor Q3) when the triggering voltage descends to a second critical value (the value at which transistor Q2 begins to turn on). These critical values, as is easily understood by inspection of the illustrated circuit, are determined in part by the forward voltage drop across diode CR1; in part by the amount of regenerative feedback voltage supplied from the collector of transistor Q3 as a component of voltage across resistor R3, which provides fast switching between the two output states; and in part by the characteristics of transistors Q1 and Q2 and the amount of emitter bias in transistor Q2 provided by voltage divider R6–R7. Accordingly, these critical values may be adjusted or varied as desired.

In its first output state, high collector current in transistor Q3, the triggered switch 10 actuates the relay 21; for use as a thermostatic control with the bridge of FIG. 1 connected as heretofore described so that low temperatures correspond to a high control voltage, the actuated relay should present to a heater as closed circuit through terminals E–F. In its second output state, low collector current in transistor Q3, the triggered switch 10 does not actuate relay 21 and terminals E–F present an open circuit to the heater.

The proportioning control means, shown within dotted line 30, is used with a triggered switch of the above described type. The proportioning control means comprises an integrating circuit which is alternately charged and discharged in the time intervals between switches of the triggered switch 10. The integrating circuit of the illustrated practical embodiment comprises a resistance and a capacitance in series; the resistance being provided by resistors R12 and R12$a$ in series, and the capacitance being provided by capacitor C3. Preferably the resistance is variable so as to permit adjustment of the time constant of the integrating circuit, and therefore resistor R12$a$ is preferably a variable resistor. Alternate charging and discharging of the integrating circuit is accomplished in the illustrated embodiment by means providing a voltage across the integrating circuit, said means switching the voltage between two fixed levels to alternately charge and discharge the capacitor C3 in the integrating circuit, said switching occurring simultaneously with that of triggered switch 10. In the illustrated embodiment, the voltage across the integrating circuit is the collector to emitter voltage of grounded emitter transistor Q4, which operates with resistances R13, R14 and R15 in a switching mode as an inverter. The input to the inverter is the collector voltage of transistor Q3. Thus when the collector voltage of transistor Q3 switches to its minimum, the collector to emitter voltage of transistor Q4 will switch to a maximum and capacitor C3 will charge in typical exponential fashion through resistors R12 and R12a. And when the collector voltage of transistor Q3 switches to its maximum, the collector voltage of transistor Q4 will switch to its minimum and capacitor C3 will discharge. Thus capacitor C3 charges while the triggered switch is in its first output state (low collector voltage in transistor Q3), and conversely, the capacitor C3 discharges while the triggered switch 10 is in its second output state (high collector voltage in transistor Q3). It will be apparent that the means providing a switching voltage across the integrating circuit could be provided in other ways than that illustrated; for example, in appropriate circumstances additional contacts on relay 21 might be used to alternatively present a battery and a short circuit across the integrating circuit.

The proportioning control means 30 further has means for feeding back a portion of the voltage across capacitor C3 to the triggered switch 10, in series with the control voltage, so that the triggered switch will be responsive to both the control voltage and the portion fed back. In the illustrated embodiment, the feedback means comprises a high input impedance, double emitter follower amplifier formed by transistors Q6 and Q7. The charging and discharging voltage across capacitor C3 serves as the input to this amplifier. The output of the double emitter follower amplifier is through the emitter of transistor Q7. As shown in FIG. 2, the emitter of transistor Q7 is connected to ground through resistor R19, variable resistor R19a, and through resistor R3 in triggered switch 10 in series with the control voltage. Therefore, a portion of the charging and discharging voltage of the integrating circuit is fed back in series with the control voltage across terminals C-D to modify the triggering voltage of the triggered switch 10. To vary the magnitude of the portion fed back, resistor R19a is provided as a variable resistor.

The electrical connections of the integrating circuit, inverter, and double emitter follower amplifier are clearly shown in FIG. 2, which is to that extent self-explanatory, while the appropriate structural characteristics, values, ratings or commercially accepted designations for each of the components are given below in a list which refers to the numerals of FIG. 2. It will be understood that the specific values and ratings given are subject to adjustments applied on initial and performance testing, according to routine practice. It will be further understood that the values as well as types of the various components are those of practical embodiments so that deviations therefrom are to be expected for other embodiments still within the scope of the invention.

Component: Value or type
C3 _____ 500 microfarads.
C4 _____ 0.1 microfarad.
R12 _____ 68K ohms.
R13 _____ 22K ohms.
R14 _____ 2K ohms.
R15 _____ 4700 ohms.
R16 _____ 47K ohms.
R17 _____ 510 ohms.
R18 _____ 100 ohms.
R19 _____ 1000 ohms.
Q4 _____ Transistor, type "2N2926."
Q6 _____ Transistor, type "2N2926."
Q7 _____ Transistor, type "2N2270."

The operaton of the circuit can now be explained with reference to the graphs of FIGS. 3a, 3b, 3c and 4a, 4b, 4c, in which the horizontal variable is time. The dotted line 40 represents the first critical value of voltage for the triggered switch 10, and the dotted line 42 represents the second critical value. These critical values are both shown negative, which results from forward bias across diode CR1. Lines 44a, 44b and 44c represent three different amplitudes of control voltage. Lines 46a, 46b and 46c represent the triggering voltage for the triggered switch 10, which is the control voltage minus the component of voltage supplied across resistor R3 as a portion of the charging and discharging voltage across capacitor C3 in the integrating circuit.

As shown in FIG. 3a, the triggering voltage 6a will rise and fall between the critical values 40 and 42, thereby causing the triggered switch 10 to switch between its two output states. These two output states are shown in FIGS. 4a, 4b and 4c, as dotted lines 50 and 52, line 50 representing first output state and line 52 representing the second output state. The solid lines in FIGS. 4a, 4b and 4c represent the durations of each state for the corresponding control voltages 44a, 44b and 44c.

As FIGS. 3a, 3b and 3c show, the capacitor C3 in the integrating circuit will charge and discharge in a different part of its exponential curve for each dfferent control voltage. For high control voltages as 44a, the capacitor C3 will charge to a high value before the second critical value 42 is reached; in this part of the charging curve, charging time is longer than discharging time and therefore the triggered switch 10 will remain longer in its first output state 50 than in its second output state 52 (FIG. 4a). Similarly, for low control voltages, as 44c, the capacitor C3 need charge only to a low value before the second critical value 42 is reached; in this part of the charging curve, charging time is shorter than discharging time, and therefore the triggered switch 10 will remain longer in its second output state 52 than in its first output state 50 (FIG. 4c). For some middle value, which may be zero as shown at 44b, charging time will equal discharging time, and therefore each output state will exist for an equal time (FIG. 4b).

It is thus apparent that the ratio of durations of the two output states varies with the amplitude of the control voltage. For illustrative purposes, the amplitudes of control voltages 44a, 44b and 44c have been shown as constants; in actual operation, of course, they are more typically of varying amplitude.

By merely changing the value of resistor R12a in the integrating circuit, the time constant of the integrating circuit can be varied. Therefore, the circuit readily can be varied in frequency to adjust to requirements imposed by heating or cooling apparatus connected to terminals E-F, or to temperature control requirements. It should be noted that in the present invention, time constants can be varied without changing the ratio of duration of the two output states. That is, the ratio of charging time to discharging time is substantially independent of the time constant of the integrating circuit. Thus frequency adjustments can be made independently of other adjustments and the circuit can be rapidly and accurately adapted to various uses.

For very high control voltages, it is apparent that the capacitor C3 will not charge enough for the triggering voltage to reach the second critical value 42, and oscillation will not occur. The triggered switch 10 will stay in its first output state 50. Similarly, for very low control voltages, the capacitor C3 will not discharge enough for the triggering voltage to reach the first critical value 40, and oscillation will not occur. The triggered switch 10 will stay in its second output state 52. By simply adjusting resistor R19a, however, the amount of capacitor C3 voltage to be fed back in series with the control voltage can be adjusted, and therefore the range of control voltages for which oscillation will occur can be adjusted.

This adjustment enables the circuit to be responsive over as broad a range as is desired, and therefore the circuit can be accurately matched, without replacing components, to requirements imposed by different external environments.

It should be understood that the foregoing description is for the purpose of illustration and that the invention includes all modifications within the scope of the appended claims.

I claim:

1. A proportioning control circuit for varying the ratio of duration of two oscillatory output states with the amplitude of a control voltage, comprising:

a triggered switch of the type responsive to a triggering voltage and switching to a first output state when its triggering voltage rises to a first critical value and to a second output state when its triggering voltage descends to a second critical value;

an integrating circuit;

means for alternately charging and discharging the integrating circuit during successive intervals between switches of said triggered switch to produce in said integrating circuit a charging and discharging voltage which varies exponentially with time for the duration of each interval; the rates of charging and discharging varying with the voltage level at which said charging and discharging takes place, said charging and discharging rates varying inversely with changes in voltage level; and feedback means for supplying a portion of the charging and discharging voltage of said integrating circuit to said triggered switch, in series with said control voltage, so that said triggered switch is responsive to a triggering voltage comprising said portion and said control voltage, said integrating circuit operating at levels of charge and discharge voltage for which said feedback portion offsets said control voltage, the charging and discharging rates associated with said levels determining the times necessary for said feedback portion to vary said triggering voltage between said first and second critical values for oscillation, whereby the ratio of duration of the two output states of the triggered switch varies with the amplitude of the control voltage.

2. A proportioning control circuit according to claim 1, wherein said integrating circuit includes a resistance and a capacitance in series, and wherein said means alternately charging and discharging the integrating circuit comprises means providing a voltage across the integrating circuit, said voltage providing means switching the voltage between two fixed values to alternately charge and discharge the capacitance, said switching occurring simultaneously with that of the triggered switch, said capacitance charging while the triggered switch is in its first output state and discharging while the triggered switch is in its second output state.

3. A proportioning control circuit according to claim 2, wherein said voltage providing means comprises an inverter, said inverter having its input connected to said triggered switch for response to changes of state therein, the output of said inverter being connected across said integrating circuit.

4. A proportioning control circuit according to claim 1, wherein said integrating circuit includes a resistance and a capacitance in series; and wherein said triggered switch includes a resistor in series with said control voltage; and wherein said feedback means comprises a high input impedance amplifier, said charging and discharging voltage across said capacitance appearing as the input to said amplifier, said amplifier having an output circuit including said resistor in series with the control voltage, whereby said portion of charging and discharging voltage appears as a component of voltage across said resistor.

5. A proportioning control circuit according to claim 4, wherein said output circuit of said amplifier further includes a variable resistor which may be adjusted to change the magnitude of said portion appearing in series with said control voltage, whereby the range of control voltages for which proportioning control will occur can be adjusted.

6. A proportioning control circuit according to claim 1, wherein said integrating circuit comprises a capacitance in series with a variable resistor, whereby the time constant of said integrating circuit may be adjusted to change the cyclic frequency of the circuit.

7. A proportioning control circuit for varying the ratio of duration of two output states with the amplitude of a control voltage, comprising: a triggered switch of the type responsive to a triggering voltage and switching to a first output state when its triggering voltage rises to a first critical value and to a second output state when its triggering voltage descends to a second critical value, said control voltage appearing at the input to the triggered switch, said triggered switch having a ressitor in series with said control voltage, said triggered switch having an output providing a first voltage when in its first output state and a second lower voltage when in its second output state;

an inverter having its inputs connected to the said output of said triggered switch;

an integrating circuit, including a variable resistance and a capacitance in series, connected across the output of said inverter; said capacitor voltage varying exponentially with time for the duration of each interval between switches of said triggered switch, the rates of charging and discharging of said capacitor varying with the voltage level at which said charging and discharging takes place; and a double emitter follower amplifier having its inputs connected across said capacitance, and having an output circuit including said resistor in series with said control voltage and a variable resistance.

References Cited

UNITED STATES PATENTS

| 2,748,272 | 5/1956 | Schrock | 328—127 |
| 3,191,071 | 6/1965 | King et al. | 307—228 |
| 3,122,652 | 2/1964 | Kobbe et al. | 307—228 |
| 3,378,701 | 4/1968 | Frank | 307—265 |

DONALD D. FORRER, Primary Examiner

B. P. DAVIS, Assistant Examiner

U.S. Cl. X.R.

307—228, 235, 293; 328—127; 317—148.5